US006818830B2

(12) United States Patent
O'Grady et al.

(10) Patent No.: US 6,818,830 B2
(45) Date of Patent: Nov. 16, 2004

(54) H-TAP COMPRESSION CONNECTOR

(75) Inventors: Bernard J. O'Grady, Crestwood, IL (US); Robert L. Sokol, Orland Park, IL (US); Robert W. Kossak, Lemont, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/668,847

(22) Filed: Sep. 23, 2003

(65) Prior Publication Data

US 2004/0074666 A1 Apr. 22, 2004

Related U.S. Application Data

(60) Provisional application No. 60/491,113, filed on Jul. 30, 2003, and provisional application No. 60/413,768, filed on Sep. 26, 2002.

(51) Int. Cl.⁷ .............................................. H01R 4/20
(52) U.S. Cl. ..................... 174/84 C; 439/877
(58) Field of Search ............................ 174/84 C, 94 R; 439/877, 878, 882; 403/275, 391

(56) References Cited

U.S. PATENT DOCUMENTS

| 2,307,216 A | 1/1943 | Graham |
| 2,427,518 A | 9/1947 | Bergan |
| 2,707,775 A | 5/1955 | Hoffman et al. |
| 2,760,798 A | 8/1956 | Evans |
| 2,884,478 A | 4/1959 | Becker et al. |
| D187,531 S | 3/1960 | Klosin |
| 2,938,069 A | 5/1960 | Toedtman et al. |
| 2,956,108 A | 10/1960 | Brenner |
| 2,964,585 A | 12/1960 | Nilsson et al. |
| 3,009,987 A | 11/1961 | Brenner |
| 3,022,370 A | 2/1962 | Osborn |
| 3,032,603 A | 5/1962 | Whitley |
| 3,053,930 A | 9/1962 | Mailanik et al. |
| 3,060,258 A | 10/1962 | Spurgeon |
| 3,088,993 A | 5/1963 | Matthysse et al. |
| 3,156,764 A | 11/1964 | Toedtman |
| 3,183,025 A | 5/1965 | Lynch, Jr. et al. |
| 3,235,654 A | 2/1966 | Eldridge, Jr. |

(List continued on next page.)

FOREIGN PATENT DOCUMENTS

DE         1277975        9/1968

OTHER PUBLICATIONS

FCI Framatome Group, Bumdy Products Catalog, p. C–101, date unknown.
FCI Framatome Group, Bumdy Products Catalog, p. C–103, date unknown.

Primary Examiner—Chau N. Nguyen
(74) Attorney, Agent, or Firm—Roberr A. McCann; Christopher S. Clancy

(57) ABSTRACT

A compression connector for securing wires therein is disclosed. The compression connector comprises a first body portion connected to a second body portion, each of the first and second body portions having two pairs of leg portions extending therefrom to form two conductor receiving channels, respectively. The compression connector also has a first pair of slots and a second pair of slots for receiving a cable tie to secure wires therein before crimping. At least one transversely-oriented slot extends between the first pair of slots and the second pair of slots. A method for securing wires within a compression connector is also disclosed.

20 Claims, 6 Drawing Sheets

U.S. PATENT DOCUMENTS

| | | |
|---|---|---|
| 3,236,938 A | 2/1966 | Toedtman |
| 3,322,888 A | 5/1967 | Zemels |
| 3,330,903 A | 7/1967 | Holke et al. |
| 3,340,352 A | 9/1967 | Teagno et al. |
| 3,354,517 A | 11/1967 | Levinsky |
| 3,387,080 A | 6/1968 | Dibble et al. |
| 3,408,455 A | 10/1968 | Dannes |
| 3,546,366 A | 12/1970 | Toedtman et al. |
| 3,746,777 A | 7/1973 | Peek |
| 3,781,459 A | 12/1973 | Peek |
| 3,897,992 A | 8/1975 | Weidler |
| 3,916,517 A | 11/1975 | Luongo |
| 4,350,843 A | 9/1982 | Campbell et al. |
| 4,828,516 A | 5/1989 | Shaffer |
| 4,940,856 A | 7/1990 | Bock |
| 4,950,838 A | 8/1990 | Gordon |
| 5,036,164 A | 7/1991 | Schrader et al. |
| 5,103,068 A * | 4/1992 | Schrader ................ 174/94 R |
| 5,162,615 A | 11/1992 | Schrader et al. |
| 5,200,576 A | 4/1993 | Schrader et al. |
| 5,396,033 A | 3/1995 | Piriz et al. |
| 5,552,564 A | 9/1996 | Schrader et al. |
| 5,635,676 A | 6/1997 | Piriz |
| 5,898,131 A | 4/1999 | Chadbourne et al. |
| 6,261,137 B1 | 7/2001 | Wilcox |
| 6,452,103 B1 | 9/2002 | Piriz |
| 6,486,403 B1 | 11/2002 | Connor |
| 6,525,270 B1 | 2/2003 | Connor et al. |
| 6,538,204 B2 | 3/2003 | Connor |
| 6,552,271 B2 | 4/2003 | Connor et al. |

* cited by examiner

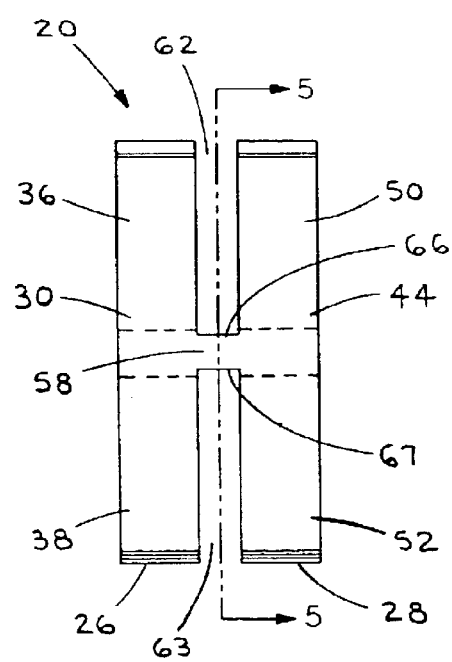
FIG.4
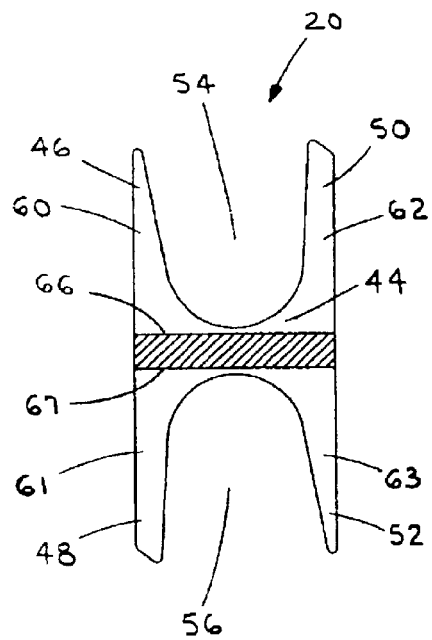
FIG.5
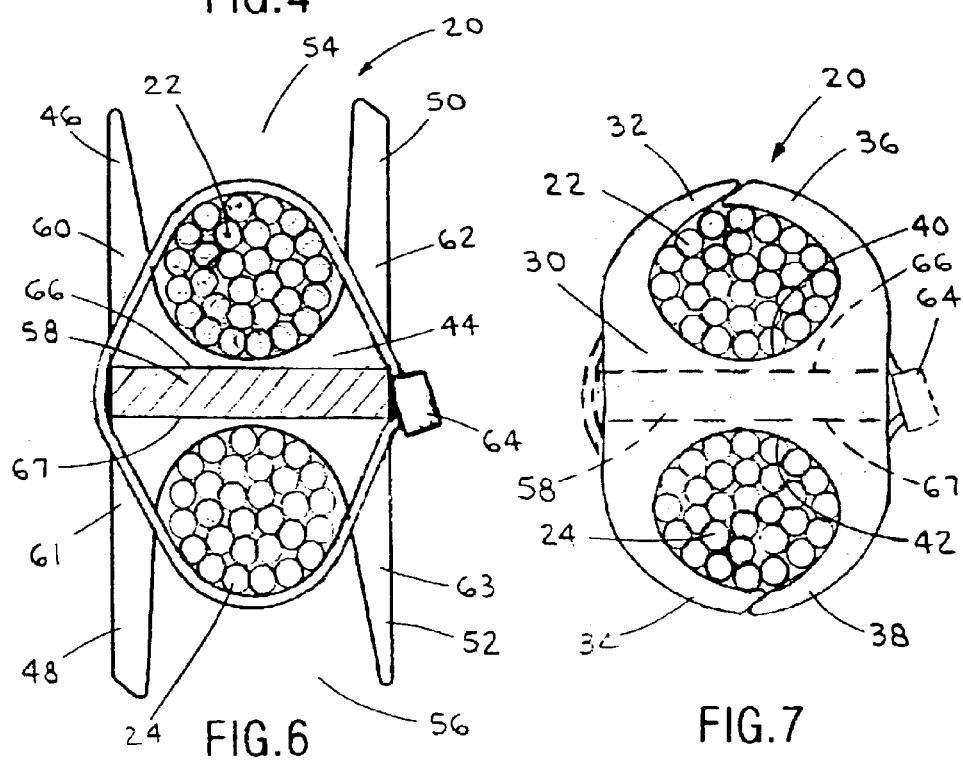
FIG.6
FIG.7

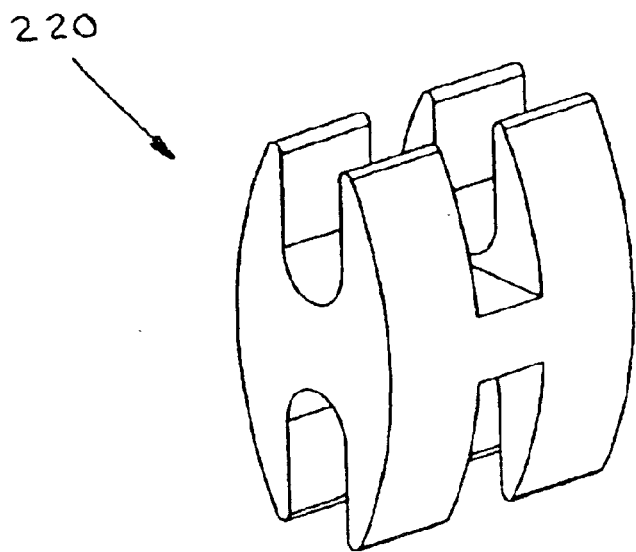
FIG. 11
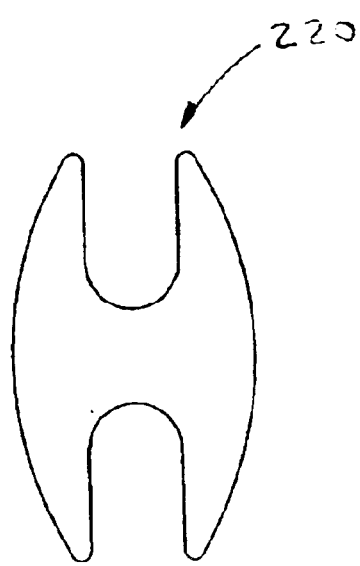 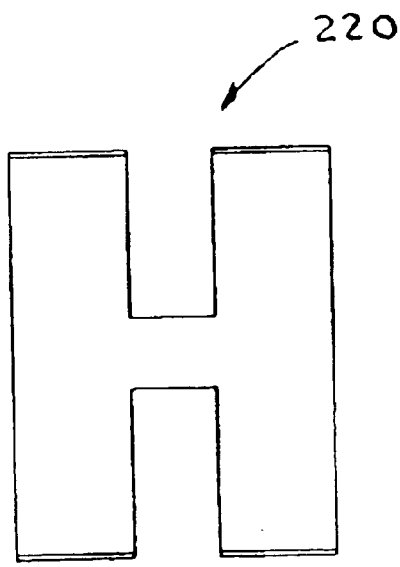
FIG. 12  FIG. 13

H-TAP COMPRESSION CONNECTOR

CROSS-REFERENCE TO RELATED APPLICATIONS

This application claims priority to U.S. Provisional Application Ser. Nos. 60/413,768, filed on Sep. 26, 2002, and 60/491,113, filed on Jul. 30, 2003, the entireties of which are hereby incorporated by reference.

BACKGROUND OF THE INVENTION

The present invention is directed to an H-tap compression connector and, more particularly, to an H-tap compression connector with an easy installation feature and a longitudinally-oriented hole therethrough.

Examples of H-tap compression connectors can be found in the following U.S. Pat. Nos. 2,307,216; 3,183,025; 3,235,654; 3,354,517; 5,162,615; 5,396,033; 5,552,564; 5,635,676; and 6,525,270. However, none of these prior art compression connectors have a transversely-oriented slot extending between a first pair of slots on one side of the compression connector and a second pair of slots on the other side of the compression connector. Moreover, none of these prior art compression connectors have a longitudinally-oriented hole extending through the center of the compression connector.

SUMMARY OF THE INVENTION

It would be desirable to provide an H-tap compression connector having increased mechanical strength.

It would also be desirable to provide an H-tap compression connector having a longitudinally-oriented hole therethrough.

It would further be desirable to provide an H-tap compression connector having symmetry about a centerline passing transversely through the center of the compression connector.

It would also be desirable to provide an H-tap compression connector that facilitates one person installation.

A compression connector for securing wires therein is disclosed. The compression connector has a first body portion connected to a second body portion. Each of the first and second body portions has two pairs of leg portions extending therefrom to form two conductor receiving channels, respectively. The compression connector also has a first pair of slots and a second pair of slots for receiving a cable tie to secure wires therein before crimping. A transversely-oriented slot extends between the first pair of slots and the second pair of slots, and an aperture extends through the first body portion or the second body portion.

Preferably, the aperture extends either longitudinally or transversely through the compression connector, and a central body portion connects the first body portion and the second body portion.

Preferably, the aperture may extend through: 1) the first body portion and the central body portion; 2) the second body portion and the central body portion; or 3) the first body portion, the central body portion and the second body portion.

Preferably, the first and second pair of leg portions have diagonally opposed symmetry, and are substantially parallel or curved. Alternatively, the first and second pair of leg portions have same-side symmetry, and are substantially parallel or curved.

Preferably, the third and fourth pair of leg portions have diagonally opposed symmetry, and are substantially parallel or curved. Alternatively, the third and fourth pair of leg portions have same-side symmetry, and are substantially parallel or curved.

BRIEF DESCRIPTION OF FIGURES

FIG. 4 is a right side view of the compression connector of FIG. 1;

FIG. 5 is a cross-sectional view of the compression connector taken along lines 5—5 of FIG. 4;

FIG. 6 is a front view of the compression connector of FIG. 1 after the run and tap wires have been secured but before crimping;

FIG. 7 is a front view of the compression connector of FIG. 1 after crimping;

FIG. 11 is a perspective view of a compression connector according to a third embodiment of the present invention;

FIG. 12 is a front view of the compression connector of FIG. 11;

FIG. 13 is a right side view of the compression connector of FIG. 11;

DETAILED DESCRIPTION OF PREFERRED EMBODIMENTS

The illustrated embodiments of the invention are directed to an H-tap compression connector having a pair of slots cut through both sides to provide a space to loop a cable tie around wires in the compression connector to secure the wires before crimping, and a transversely-oriented slot extending between the compression connector sides. Moreover, the compression connector has a longitudinally-oriented hole therethrough.

Figure 1:
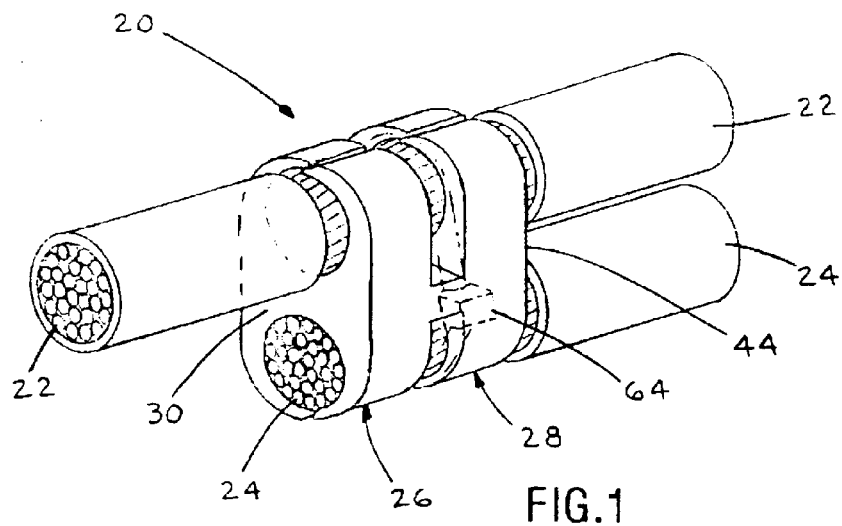
FIG. 1 is a perspective view of a compression connector of the present invention shown secured around run and tap wires after crimping.

A first embodiment of the present invention is illustrated in FIGS. 1–7. FIG. 1 shows an H-tap compression connector 20 secured around wires, such as run wires 22 and tap wires 24, after crimping. Preferably, compression connector 20 is a one-piece member made of electrically conductive material, such as copper. However, it is likewise contemplated that compression connector 20 may be made of any suitable materials or elements.

As shown in FIGS. 2–5, compression connector 20 has a first section 26 and a second section 28. First section 26 includes a first body portion 30 having four leg portions 32, 34, 36, 38 extending therefrom to form conductor receiving channels 40, 42 in which run wires 22 and tap wires 24 can be placed. Second section 28 is identical to first section 26. Thus, second section 28 includes a second body portion 44 having four leg portions 46, 48, 50, 52 extending therefrom to form conductor receiving channels 54, 56 in which run wires 22 and tap wires 24 can be placed. As best seen in FIG. 4, a central body portion 58 connects first body portion 30 and second body portion 44.

Figure 2:
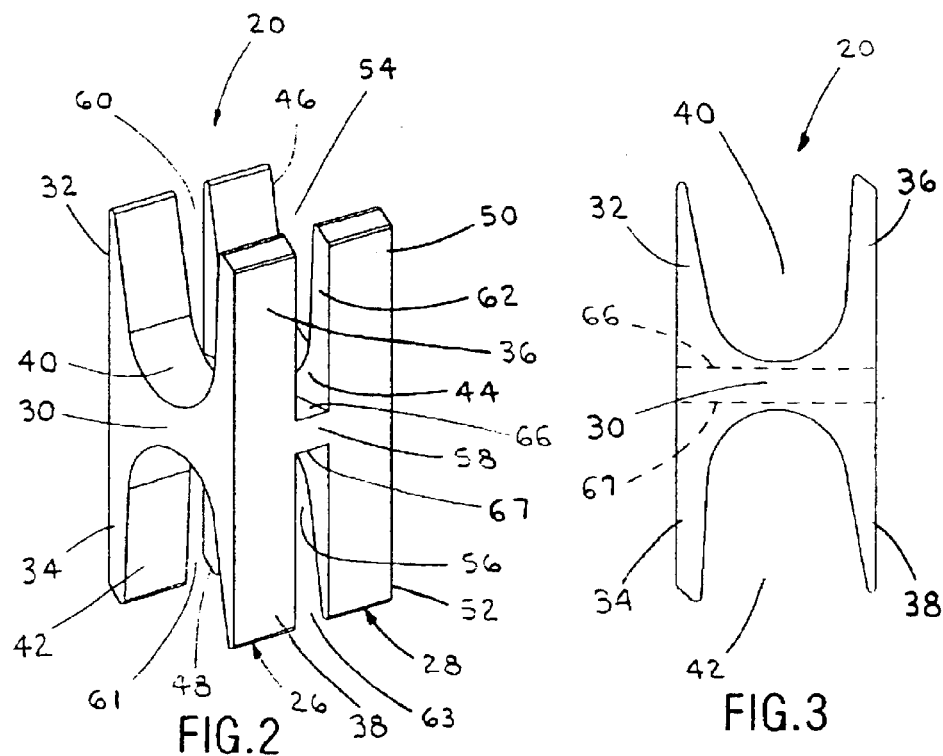
FIG. 2 is a perspective view of the compression connector of FIG. 1.
Figure 3:
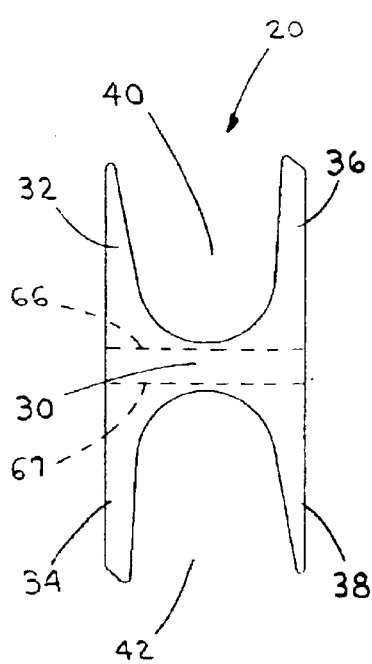
FIG. 3 is a front view of the compression connector of FIG. 1.

As shown in FIG. 2, compression connector 20 includes four slots 60, 61, 62, 63 cut through the sides of compression connector 20. Slots 60, 61, 62, 63 provide space to loop a cable tie 64 to secure run wires 22 and tap wires 24 to compression connector 20 before crimping, as shown in FIG. 6. As shown in FIG. 2, a transversely-oriented slot 66 extends between slots 60, 62, and as best seen in FIGS. 3 and 5, slot 66 is positioned below conductor receiving channels 40, 54. Similarly, a transversely-oriented slot 67 extends between slots 61, 63, and as best seen in FIG. 4, slot 67 is positioned above conductor receiving channels 42, 56. Slots 60, 61, 62, 63 allow crimped wire material to flow between first section 26 and second section 28. During crimping, the wire material that flows between first section 26 and second section 28 fills slots 66, 67 creating a mechanical lock. Thus, slots 66, 67 increase wire pullout force and, in turn, increase the mechanical strength of compression connector 20.

In operation, run wires 22 and tap wires 24 are inserted into compression connector 20 and retained in position prior to crimping using cable tie 64, as shown in FIG. 6. Alternatively, a first cable tie may be utilized to secure tap wires 24 to compression connector 20, and then a second cable tie may be utilized to secure run wires 22 and tap wires 24 to compression connector 20. When run wires 22 and tap wires 24 are secured to compression connector 20, the installer is free to position the crimp tool over compression connector 20 and begin crimping. Compression connector 20 is crimped with one single crimp over first section 26 and second section 28. Compression connector 20 is crimped with cable tie 64 in place using a crimp tool, such as Panduit® CT-2940 crimp tool, fitted with a pair of crimp dies, such as Panduit® CD-940H-250 crimp dies. As shown in FIG. 7, after crimping, cable tie 64 is loosely secured around run wires 22 and tap wires 24. Cable tie 64 can be removed or left in place.

Figure 8:
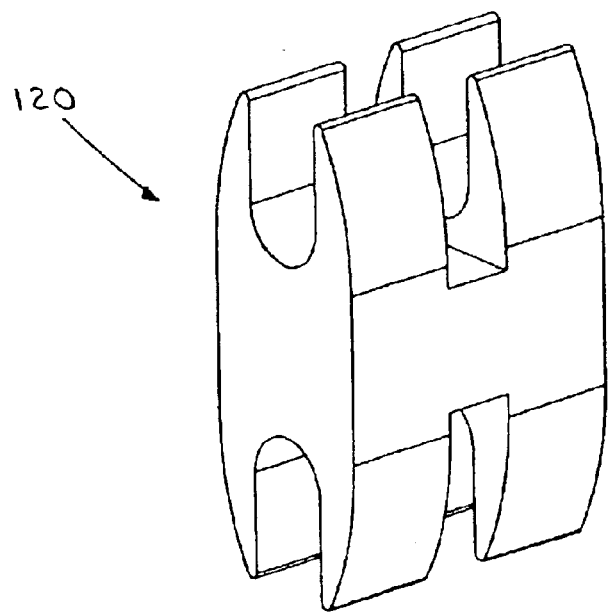
FIG. 8 is a perspective view of a compression connector according to a second embodiment of the present invention.
Figures 9, 10:
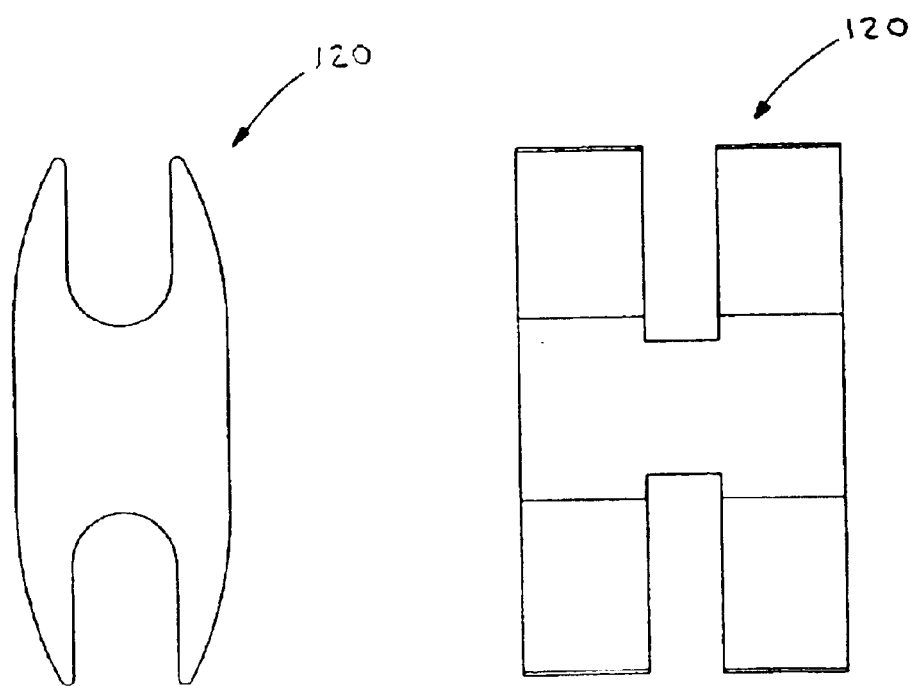
FIG. 9 is a front view of the compression connector of FIG. 8.
FIG. 10 is a right side view of the compression connector of FIG. 8.

A second embodiment of the present invention is illustrated in FIGS. 8–10. As shown in FIG. 8, an H-tap compression connector 120 is substantially the same as compression connector 20 illustrated in FIGS. 1–7, except compression connector 120 has curved leg portions and is designed to accommodate smaller wires than compression connector 20. However, compression connector 120 functions similarly to compression connector 20.

A third embodiment of the present invention is illustrated in FIGS. 11–13. As shown in FIG. 11, an H-tap compression connector 220 is substantially the same as compression connector 20 illustrated in FIGS. 1–7, except compression connector 220 has curved leg portions and is designed to accommodate smaller wires than compression connector 20. However, compression connector 220 functions similarly to compression connector 20 illustrated in FIGS. 1–7.

Figure 14:
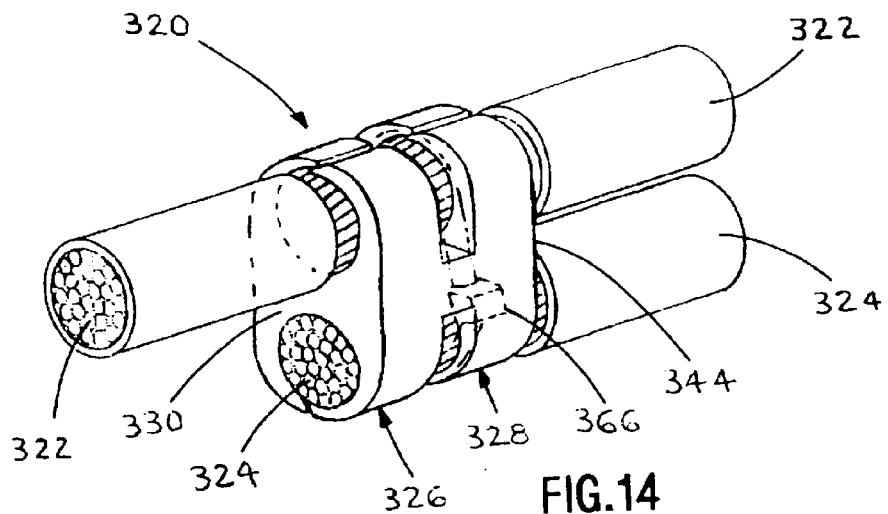
FIG. 14 is a perspective view of a compression connector according to a fourth embodiment of the present invention shown secured around run and tap wires after crimping.

A fourth embodiment of the present invention is illustrated in FIGS. 14–20. FIG. 14 shows an H-tap compression connector 320 secured around wires, such as run wires 322 and tap wires 324, after crimping. Preferably, compression connector 320 is a one-piece member made of electrically conductive material, such as copper. However, it is likewise contemplated that compression connector 320 may be made of any suitable materials or elements.

Figures 15, 16:
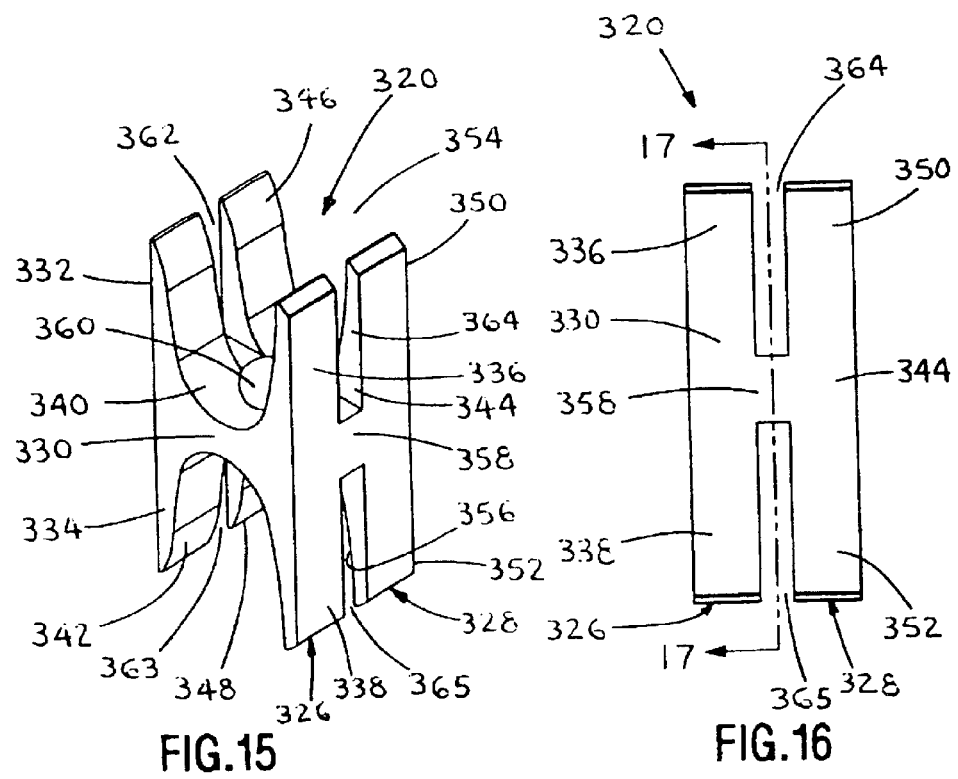
FIG. 15 is a perspective view of the compression connector of FIG. 14.
FIG. 16 is a left side view of the compression connector of FIG. 14.
Figures 17, 18:
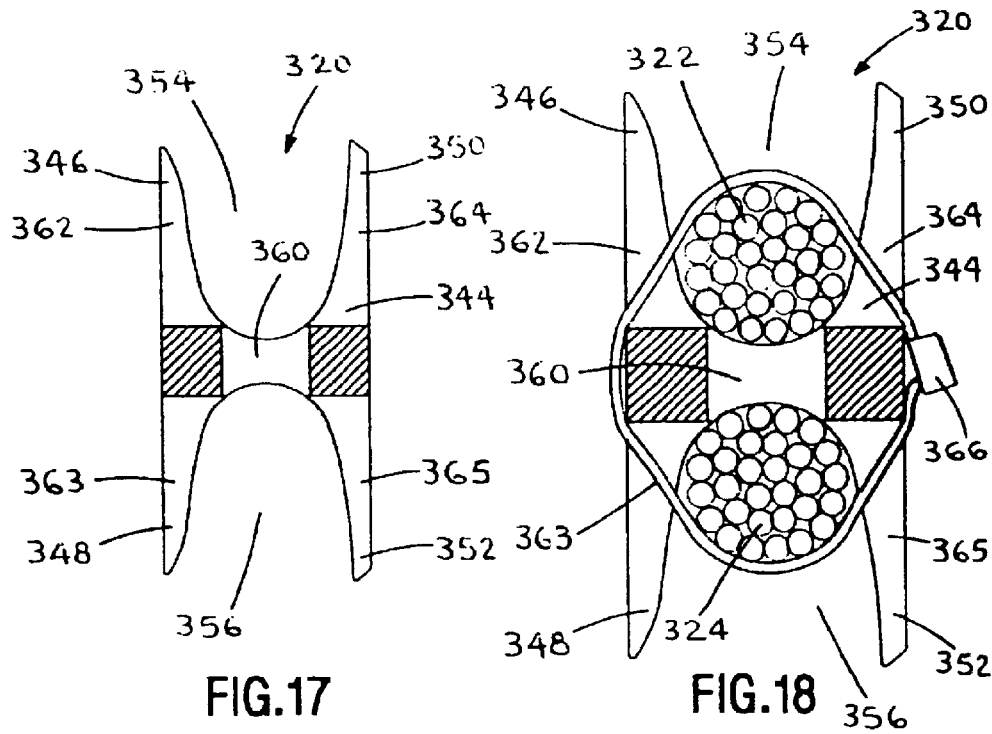
FIG. 17 is a cross-sectional view of the compression connector taken along lines 17—17 of FIG. 16.
FIG. 18 is a front view of the compression connector of FIG. 14 after the run and tap wires have been secured but before crimping.

As shown in FIGS. 15–17, compression connector 320 has a first section 326 and a second section 328. First section 326 includes a first body portion 330 having four leg portions 332, 334, 336, 338 extending therefrom to form conductor receiving channels 340, 342 in which run wires 322 and tap wires 324 can be placed. Second section 328 is identical to first section 326. Thus, second section 328 includes a second body portion 344 having four leg portions 346, 348, 350, 352 extending therefrom to form conductor receiving channels 354, 356 in which run wires 322 and tap wires 324 can be placed.

Figures 19, 20:
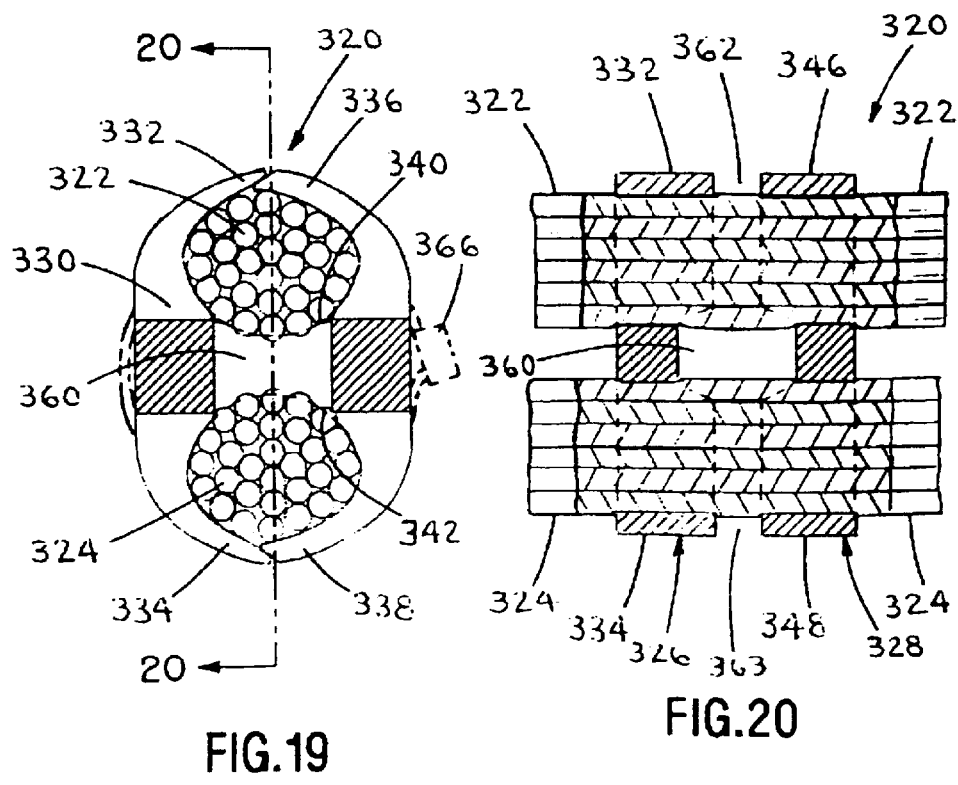
FIG. 19 is a front view of the compression connector of FIG. 14 after crimping.
FIG. 20 is a cross-sectional view of the compression connector taken along lines 20—20 of FIG. 19.

As best seen in FIGS. 15 and 16, a central body portion 358 connects first body portion 330 and second body portion 344, and central body portion 358 has a longitudinally-oriented hole 360 extending therethrough. Alternatively, hole 360 may extend transversely through central body portion 358. Preferably, hole 360 extends longitudinally through first body portion 330, central body portion 358 and second body portion 344. Alternatively, hole 360 may extend through only first body portion 330 and central body portion 358. Similarly, hole 360 may extend through only second body portion 344 and central body portion 358. During crimping, and as shown in FIG. 20, run wires 322 and tap wires 324 get pushed into hole 360, and a mechanical lock is created. Thus, hole 360 increases wire pullout force and, in turn, increases the mechanical strength of compression connector 320.

Typically, leg portions 32, 34, 36, 38 have diagonally opposed symmetry. As best seen in FIG. 3, leg portions 32 and 38 are symmetrical, and leg portions 34 and 36 are symmetrical. Similarly, leg portions 46, 48, 50, 52 have diagonally opposed symmetry. As best seen in FIG. 5, leg portions 46 and 52 are symmetrical, and leg portions 48 and 50 are symmetrical.

Conversely, the embodiment illustrated in FIGS. 14–20 incorporates symmetry about a center line passing transversely through the center of compression connector 320. Thus, as best seen in FIG. 15, leg portions 332 and 334 are symmetrical, and leg portions 336 and 338 are symmetrical. Similarly, as best seen in FIGS. 17 and 18, leg portions 346 and 348 are symmetrical, and leg portions 350 and 352 are symmetrical. As a result, during the crimping process, compression connector 320 remains continually in the same position relative to the crimping die, which eliminates jamming of the crimp tool caused by pivoting or shifting of compression connector 320 during crimping.

As shown in FIG. 15, compression connector 320 includes four slots 362, 363, 364, 365 cut through compression connector 320. Slots 362, 363, 364, 365 provide space to loop a cable tie 366 to secure run wires 322 and tap wires 324 to compression connector 320 before crimping, as shown in FIG. 18. Slots 362, 363, 364, 365 also allow crimped wire material to flow between first section 326 and second section 328. During crimping, the wire material that flows between first section 326 and second section 328 acts as a mechanical lock with the inside edges of compression connector 320 to increase wire pullout force.

In operation, run wires 322 and tap wires 324 are inserted into compression connector 320 and retained in position prior to crimping using cable tie 366, as shown in FIG. 18. Alternatively, a first cable tie may be utilized to secure tap wires 324 to compression connector 320, and then a second cable tie may be utilized to secure run wires 322 and tap wires 324 to compression connector 320. When run wires 322 and tap wires 324 are secured to compression connector 320, the installer is free to position the crimp tool over compression connector 320 and begin crimping. Compression connector 320 is crimped with one single crimp over first section 326 and second section 328. Compression connector 320 is crimped with cable tie 364 in place using a crimp tool, such as Panduit® CT-2940 crimp tool, fitted with a pair of crimp dies, such as Panduit® CD-940H-250 crimp dies. As shown in FIG. 19, after crimping, cable tie 366 is loosely secured around run wires 322 and tap wires 324. Cable tie 366 can be removed or left in place.

The disclosed invention provides an H-tap compression connector having a longitudinally-oriented hole therethrough. It should be noted that the above-described illustrated embodiments and preferred embodiments of the invention are not an exhaustive listing of the form such a compression connector in accordance with the invention might take; rather, they serve as exemplary and illustrative of embodiments of the invention as presently understood. By way of example, and without limitation, a transversely-oriented hole may be formed through the compression connector. Many other forms of the invention are believed to exist.

What is claimed is:

1. A compression connector for securing wires therein, the compression connector comprising:
    a first body portion having a first pair and a second pair of leg portions extending therefrom to form a first conductor receiving channel and a second conductor receiving channel, respectively;
    a second body portion connected to the first body portion, the second body portion having a third pair and a fourth pair of leg portions extending therefrom to form a third conductor receiving channel and a fourth conductor receiving channel, respectively;
    a first pair of slots extending between the first pair and the third pair of leg portions, and a second pair of slots extending between the second pair and the fourth pair of leg portions, the first pair of slots and the second pair of slots receiving a cable tie for securing wires therein before crimping; and
    at least one transversely-oriented slot extending between the first pair of slots and the second pair of slots.

2. The compression connector of claim 1 wherein a central body portion connects the first body portion and the second body portion.

3. The compression connector of claim 1 wherein the first pair and the second pair of leg portions have diagonally opposed symmetry.

4. The compression connector of claim 1 wherein the first pair and the second pair of leg portions have same-side symmetry.

5. The compression connector of claim 1 wherein the third pair and the fourth pair of leg portions have diagonally opposed symmetry.

6. The compression connector of claim 1 wherein the third pair and the fourth pair of leg portions have same-side symmetry.

7. The compression connector of claim 1 wherein each of the first pair, the second pair, the third pair and the fourth pair of leg portions are substantially parallel.

8. The compression connector of claim 1 wherein two transversely-oriented slots extend between the first pair of slots and the second pair of slots.

9. A compression connector for securing wires therein, the compression connector comprising:
    a first body portion having a first pair and a second pair of leg portions extending therefrom to form a first conductor receiving channel and a second conductor receiving channel, respectively;
    a second body portion connected to the first body portion, the second body portion having a third pair and a fourth pair of leg portions extending therefrom to form a third conductor receiving channel and a fourth conductor receiving channel, respectively;
    a first pair of slots extending between the first pair and the third pair of leg portions, and a second pair of slots extending between the second pair and the fourth pair of leg portions, the first pair of slots and the second pair of slots receiving a cable tie for securing wires therein before crimping; and
    an aperture extending through the first body portion or the second body portion.

10. The compression connector of claim 9 wherein the aperture extends longitudinally therethrough.

11. The compression connector of claim 9 wherein the aperture extends transversely therethrough.

12. The compression connector of claim 9 wherein a central body portion connects the first body portion and the second body portion.

13. The compression connector of claim 12 wherein the aperture extends through the first body portion and the central body portion.

14. The compression connector of claim 12 wherein the aperture extends through the second body portion and the central body portion.

15. The compression connector of claim 12 wherein the aperture extends through the first body portion, the central body portion and the second body portion.

16. The compression connector of claim 9 wherein the first pair and the second pair of leg portions have diagonally opposed symmetry.

17. The compression connector of claim 9 wherein the first pair and the second pair of leg portions have same-side symmetry.

18. The compression connector of claim 9 wherein the third pair and the fourth pair of leg portions have diagonally opposed symmetry.

19. The compression connector of claim 9 wherein the third pair and the fourth pair of leg portions have same-side symmetry.

20. The compression connector of claim 9 wherein each of the first pair, the second pair, the third pair and the fourth pair are substantially parallel.

* * * * *